(12) United States Patent
Mousavi et al.

(10) Patent No.: US 11,709,920 B2
(45) Date of Patent: Jul. 25, 2023

(54) FACILITY MANAGEMENT SYSTEMS AND METHODS THEREOF

(71) Applicant: JOHNSON CONTROLS TECHNOLOGY COMPANY, Auburn Hills, MI (US)

(72) Inventors: Leyla Mousavi, Milwaukee, WI (US); Scott G. Ambelang, Milwaukee, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 366 days.

(21) Appl. No.: 16/855,670

(22) Filed: Apr. 22, 2020

(65) Prior Publication Data

US 2020/0342080 A1    Oct. 29, 2020

Related U.S. Application Data

(60) Provisional application No. 62/840,148, filed on Apr. 29, 2019.

(51) Int. Cl.
*H04L 29/06*         (2006.01)
*G06F 21/32*         (2013.01)
(Continued)

(52) U.S. Cl.
CPC ............ *G06F 21/32* (2013.01); *G06F 11/326* (2013.01); *G06F 11/328* (2013.01);
(Continued)

(58) Field of Classification Search
None
See application file for complete search history.

(56) References Cited

U.S. PATENT DOCUMENTS 6,000,031 A * 12/1999 Bingaman ........... H04M 3/4931
                                                                    726/2
6,644,557 B1 * 11/2003 Jacobs ..................... F24F 11/30
                                                                    726/16
(Continued)

OTHER PUBLICATIONS

U.S. Appl. No. 62/595,757, filed Dec. 12, 2017, Zimmerman et al.

*Primary Examiner* — Tri M Tran
(74) *Attorney, Agent, or Firm* — Foley & Lardner LLP

(57) ABSTRACT

A facility management system comprises a server, a biometric identification unit, and a processing circuit. The server is configured to store a list of registered users, and biometric information and access rights pertaining to each registered users. The biometric identification unit is associated with the building equipment. The biometric identification unit is enabled to facilitate a user desiring access to the associated building equipment to scan at least one biometric parameter, and subsequent to scanning of the biometric parameter the biometric identification unit is configured to generate a scanned biometric information. The processing circuit is communicatively coupled with the server and the biometric identification unit, and is configured to: authenticate the user based on the biometric information and the scanned biometric information; determine the access rights for the authenticated user; and subsequently provide access to the authenticated user to operate the associated building equipment based on the determined access rights.

20 Claims, 11 Drawing Sheets

(51) Int. Cl.
*G06F 21/35* (2013.01)
*G06F 11/32* (2006.01)
*G06F 21/30* (2013.01)

(52) U.S. Cl.
CPC ............ *G06F 21/305* (2013.01); *G06F 21/35* (2013.01); *G06F 2221/2141* (2013.01)

(56) References Cited

U.S. PATENT DOCUMENTS

| | | |
|---|---|---|
| D763,707 S | 8/2016 | Sinha et al. |
| 9,964,328 B2 | 5/2018 | Ribbich et al. |
| 10,310,477 B2 | 6/2019 | Sinha et al. |
| 10,458,669 B2 | 10/2019 | Ribbich et al. |
| 2014/0269614 A1* | 9/2014 | Maguire ............ H04W 12/068 370/331 |
| 2016/0327298 A1 | 11/2016 | Sinha et al. |
| 2017/0142124 A1* | 5/2017 | Mukhin ................. G06F 21/30 |
| 2018/0122167 A1* | 5/2018 | Maggioni ................ G07C 9/32 |
| 2018/0299161 A1 | 10/2018 | Ribbich et al. |
| 2018/0351925 A1* | 12/2018 | Badri ................ H04L 63/0853 |

* cited by examiner

FACILITY MANAGEMENT SYSTEMS AND METHODS THEREOF

CROSS-REFERENCE TO RELATED PATENT APPLICATION

This application claims the benefit of and priority to U.S. Provisional Patent Application No. 62/840,148 filed Apr. 29, 2019, the entire disclosure of which is incorporated by reference herein.

BACKGROUND

The present disclosure relates generally to building systems that control environmental conditions of a building. The present disclosure relates more particularly to thermostats of a building system.

Systems of a building may include various controllers configured to generate control decisions for heating or cooling equipment or systems. The controllers can, in some cases, be thermostats. Thermostats can be utilized in both residential and commercial building systems. Thermostats can receive, or themselves measure, environmental conditions such as temperature and generate control decisions based on setpoints and/or the measured temperature for operating the heating or cooling equipment or systems. Thermostats include physical displays for presenting measured or control information to a user and for receiving input from the user, e.g., a user desired setpoint or operating schedule.

Conventionally, building equipment such as thermostats are being secured either by means of a manual locking mechanism or electronically by employing passcode based locking mechanisms. In either cases, there exist a possibility of fraudulently gaining access to the building equipment by an unauthorized user. Particularly, in order to digitize the locking mechanism and eliminate the need of having a person dedicated to manually unlock the building equipment, passcode based locks were introduced. However, these passcode based locking mechanism still lack to provide complete security as the passcode can be easily communicated or shared with un-authorized persons. Additionally, the conventional locking mechanism is dedicated for a single building equipment which increases the overall cost of having digital locking mechanism, and also the user is required to repeatedly provide passcode while accessing each building equipment. Still further, conventionally, it is difficult to maintain, assign, and re-assign access rights of a user and also to provide access to control the building equipment based on the varied access rights of authorized users.

Therefore, there is felt a need to provide a facility management system and a method for controlling access to building equipment which is secure, cost-effective, user friendly, and can easily assign and re-assign the access rights for each user.

SUMMARY

One implementation of the present disclosure is to provide a system for controlling access to one or more building equipment. In an embodiment, the building equipment is a thermostat. The building equipment corresponds to a building management equipment deployed within a facility. The system comprises a server, a biometric identification unit, and a processing circuit. The server is configured to store a list of registered users, and one or more biometric information and access rights pertaining to each of the registered users. The biometric identification unit is associated with the building equipment. In an embodiment, a single biometric identification unit is associated with a single building equipment. In another embodiment, single biometric identification unit is associated with multiple building equipment. The biometric identification unit is enabled to facilitate a user desiring access to the associated building equipment to scan at least one biometric parameter, and subsequent to scanning of the biometric parameter the biometric identification unit is configured to generate a scanned biometric information. In accordance with an embodiment of the present disclosure, the biometric parameter is selected from the group consisting of facial recognition, fingerprint recognition, iris recognition, voice recognition, and palm recognition.

The processing circuit is associated with the building equipment, and is communicatively coupled with the server and the biometric identification unit. The processing circuit is configured to: authenticate the user based on the biometric information contained within the server and the scanned biometric information; subsequent to successful authentication of the user the processing circuit is enabled to determine the access rights for the authenticated user; and provide access to the authenticated user to operate the associated building equipment based on the determined access rights.

In another implementation of the present disclosure, a system for controlling access to one or more building equipment located within a building is envisaged. The system comprises a biometric identification unit and a processing circuit. The biometric identification unit is associated with a building equipment, and is configured to scan at least one biometric parameter of a user desiring access to the associated building equipment. Subsequent to scanning of at least one biometric parameter the biometric identification unit is configured to generate a scanned biometric information. The processing circuit is associated with the building equipment, and is communicatively coupled with the biometric identification unit. In an embodiment, the processing unit is housed within the building equipment. The processing circuit is configured to store a list of associated users having access to the building equipment, and one or more biometric information and access rights corresponding to each of the associated users. The associated user, in accordance with this embodiment, are the users those are authorized to control the operation of said building equipment. In one implementation, the system comprises a plurality of building equipment, wherein the processing circuit corresponding to each of the building equipment is configured to store list of associated user, i.e., users associated with the corresponding building equipment. Further, the processing circuit is configured to: authenticate the user based on the biometric information corresponding to the list of associated users and the scanned biometric information; and subsequently determine the access rights for the authenticated user and provide access to the authenticated user to operate the building equipment based on the determined access rights.

In accordance with this implementation of the present disclosure, the system includes a server that is configured to store a master list of users, and affiliated one or more building equipment, one or more biometric information and access rights corresponding to each of said users. Additionally, the server is configured to periodically update the list of associated users, and one or more biometric information and access rights corresponding to each of the associated users stored within each of the building equipment.

The present disclosure also envisages a method for controlling access to a building equipment having a processing circuit. The method includes the steps performed by the processing circuit comprising: storing, a list of associated users having access to the building equipment, and one or more biometric information and access rights corresponding to each of the associated users; receiving, scanned biometric information from a biometric identification unit associated with the building equipment; authenticating, the user based on the biometric information corresponding to the list of associated users and the received biometric information. Further, the method includes the steps of determining, access rights for the authenticated user; and subsequently providing, access to the authenticated user to operate the building equipment associated with the biometric identification unit, based on the determined access rights.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Before turning to the Figures, it should be understood that the disclosure is not limited to the details or methodology set forth in the description or illustrated in the figures. It should also be understood that the terminology is for the purpose of description only and should not be regarded as limiting.

Referring generally to the Figures, a facility management system and a method thereof is envisaged, wherein the system is configured to control access to one or more building equipment. These building equipment may be referred as edge devices, IoT enabled devices, thermostats, or any building automation/management devices.

The present disclosure describes systems and methods that address the shortcomings of conventional systems and techniques. For example, embodiments of the system disclosed herein can be configured to eliminate dependency on passcodes which can be easily misused by sharing the same with peers and non-authorized users. The system of the present disclosure relies on the biometric information of the registered users thereby restricting unauthorized access to building equipment.

Building Management System and HVAC System

Figure 1:
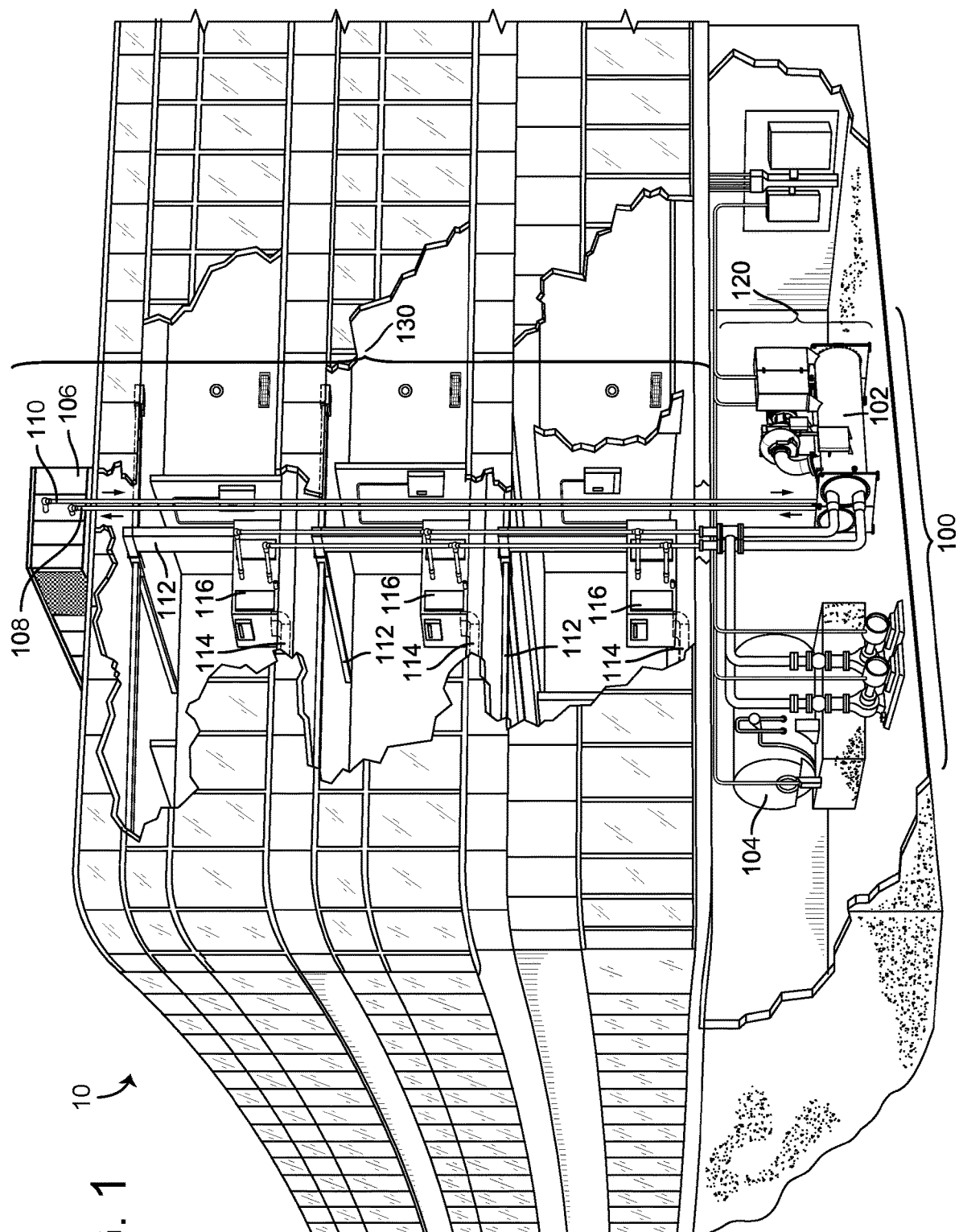
FIG. 1 is a drawing of a building equipped with a HVAC system, according to an exemplary embodiment.
Figure 2:
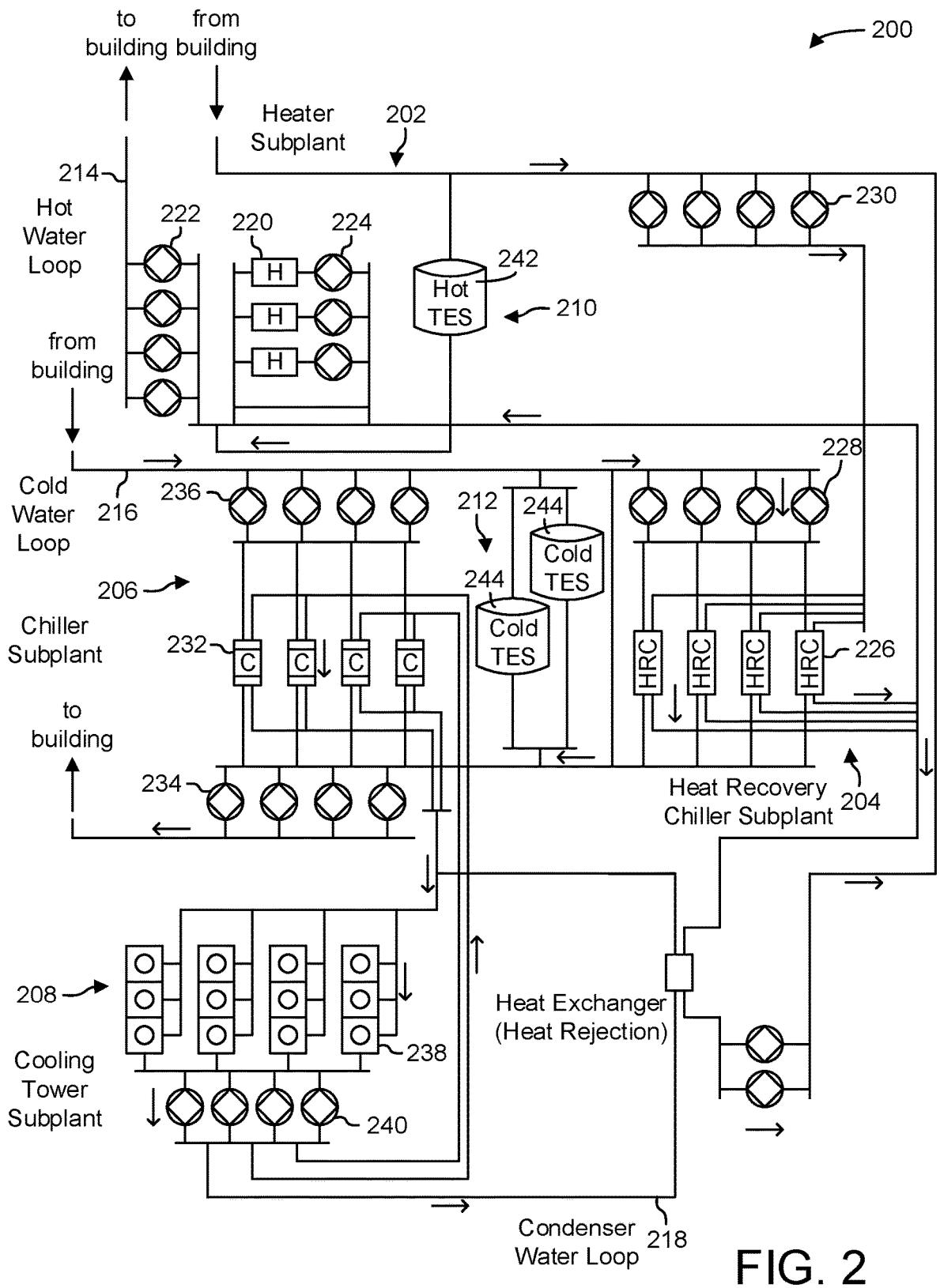
FIG. 2 is a block diagram of a waterside system that may be used in conjunction with the building of FIG. 1, according to an exemplary embodiment.
Figure 3:
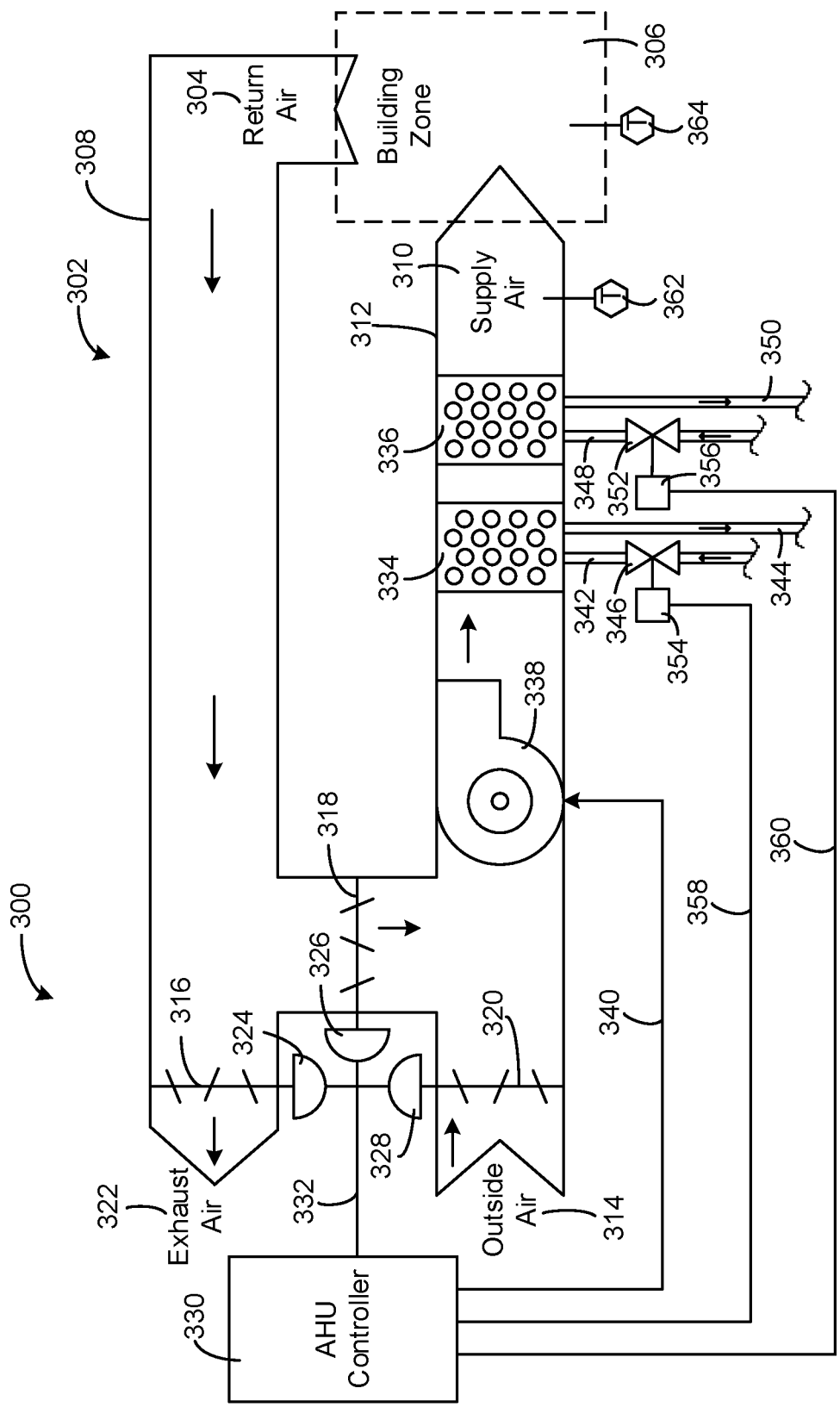
FIG. 3 is a block diagram of an airside system that may be used in conjunction with the building of FIG. 1, according to an exemplary embodiment.

Referring now to FIGS. 1-3, an exemplary building management system (BMS) and HVAC system in which the systems and methods of the present invention can be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve set-point conditions for the building zone.

Referring now to FIG. 2, a block diagram of a waterside system 200 is shown, according to an exemplary embodiment. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) can be used in place of or in addition to water to serve the thermal energy loads. In other embodiments, subplants 202-212 can provide heating and/or cooling directly to the building or campus without requiring an intermediate heat transfer fluid. These and other variations to waterside system 200 are within the teachings of the present invention.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Referring now to FIG. 3, a block diagram of an airside system 300 is shown, according to an exemplary embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a set-point temperature for supply air 310 or to maintain the temperature of supply air 310 within a set-point temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, set-points, operating boundaries, etc.) and provides information to BMS controller 366 (e.g., temperature measurements, valve or actuator positions, operating statuses, diagnostics, etc.). For example, AHU controller 330 can provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Residential HVAC System

Figure 4:
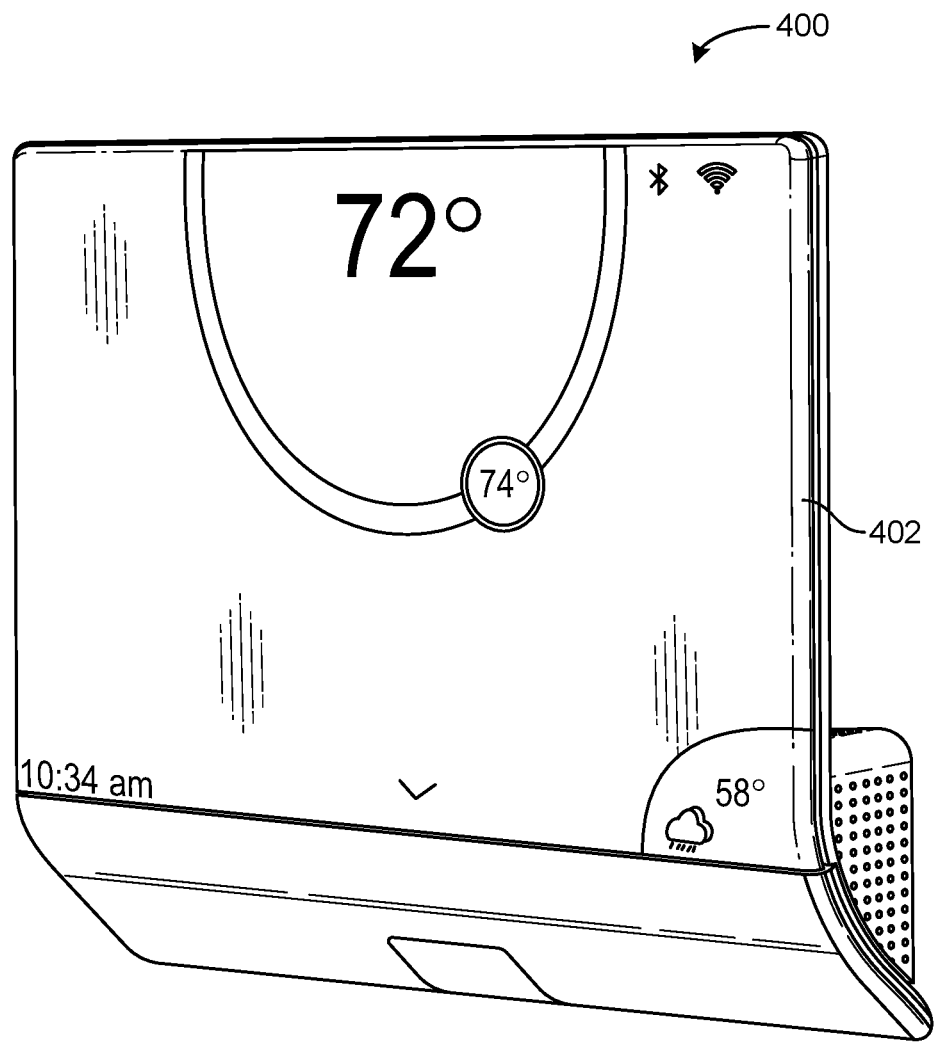
FIG. 4 is a drawing of a thermostat with a transparent display, according to an exemplary embodiment.

Referring now to FIG. 4, a drawing of a thermostat 400 for controlling building equipment is shown, according to an exemplary embodiment. The thermostat 400 is shown to include a display 402. The display 402 may be an interactive display that can display information to a user and receive input from the user. The display may be transparent such that a user can view information on the display and view the surface located behind the display. Thermostats with transparent displays are described in further detail in U.S. patent application Ser. No. 15/143,373 filed Apr. 29, 2016, and U.S. Design Application No. 29/525,907 filed May 4, 2015, the entirety of which is incorporated by reference herein. Thermostats with transparent and cantilevered displays are described in further detail in U.S. patent application Ser. No. 15/146,649 filed May 4, 2016, the entirety of which is incorporated by reference herein.

The display 402 can be a touchscreen or other type of electronic display configured to present information to a user in a visual format (e.g., as text, graphics, etc.) and receive input from a user (e.g., via a touch-sensitive panel). For example, the display 402 may include a touch-sensitive panel layered on top of an electronic visual display. A user can provide inputs through simple or multi-touch gestures by touching the display 402 with one or more fingers and/or with a stylus or pen. The display 402 can use any of a variety of touch-sensing technologies to receive user inputs, such as capacitive sensing (e.g., surface capacitance, projected capacitance, mutual capacitance, self-capacitance, etc.), resistive sensing, surface acoustic wave, infrared grid, infrared acrylic projection, optical imaging, dispersive signal technology, acoustic pulse recognition, or other touch-sensitive technologies known in the art. Many of these technologies allow for multi-touch responsiveness of display 402 allowing registration of touch in two or even more locations at once. The display may use any of a variety of display technologies such as light emitting diode (LED), organic light-emitting diode (OLED), liquid-crystal display (LCD), organic light-emitting transistor (OLET), surface-conduction electron-emitter display (SED), field emission display (FED), digital light processing (DLP), liquid crystal on silicon (LCoC), or any other display technologies known in the art. In some embodiments, the display 402 is configured to present visual media (e.g., text, graphics, etc.) without requiring a backlight.

Figure 5:
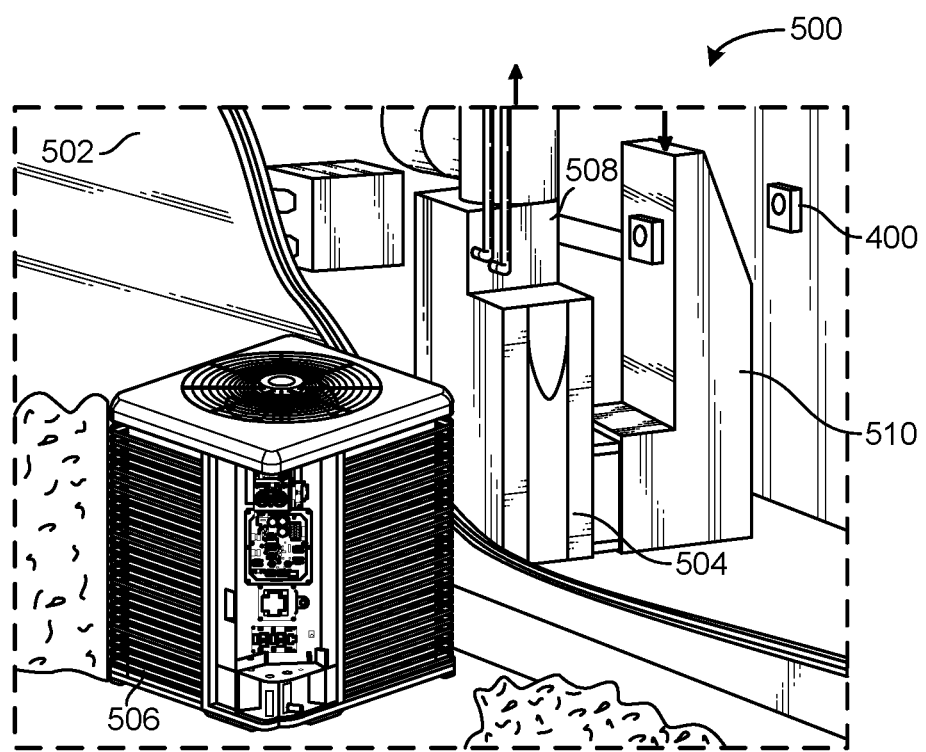
FIG. 5 is a schematic drawing of a building equipped with a residential heating and cooling system and the thermostat of FIG. 1A, according to an exemplary embodiment.

Referring now to FIG. 5, a residential heating and cooling system 500 is shown, according to an exemplary embodiment. The residential heating and cooling system 500 may provide heated and cooled air to a residential structure. Although described as a residential heating and cooling system 500, embodiments of the systems and methods described herein can be utilized in a cooling unit or a heating unit in a variety of applications include commercial HVAC units (e.g., roof top units). In general, a residence 502 includes refrigerant conduits that operatively couple an indoor unit 506 to an outdoor unit 504. Indoor unit 28 may be positioned in a utility space, an attic, a basement, and so forth. Outdoor unit 504 is situated adjacent to a side of residence 502. Refrigerant conduits transfer refrigerant between indoor unit 506 and outdoor unit 504, typically transferring primarily liquid refrigerant in one direction and primarily vaporized refrigerant in an opposite direction.

When the system 500 shown in FIG. 5 is operating as an air conditioner, a coil in outdoor unit 504 serves as a condenser for recondensing vaporized refrigerant flowing from indoor unit 506 to outdoor unit 504 via one of the refrigerant conduits. In these applications, a coil of the indoor unit 506, designated by the reference numeral 508, serves as an evaporator coil. Evaporator coil 508 receives liquid refrigerant (which may be expanded by an expansion device, not shown) and evaporates the refrigerant before returning it to outdoor unit 504.

Outdoor unit 504 draws in environmental air through its sides, forces the air through the outer unit coil using a fan, and expels the air. When operating as an air conditioner, the air is heated by the condenser coil within the outdoor unit 504 and exits the top of the unit at a temperature higher than it entered the sides. Air is blown over indoor coil 504 and is then circulated through residence 502 by means of ductwork 510, as indicated by the arrows entering and exiting ductwork 510. The overall system 500 operates to maintain a desired temperature as set by thermostat 400. When the temperature sensed inside the residence 502 is higher than the set point on the thermostat 400 (with the addition of a relatively small tolerance), the air conditioner will become operative to refrigerate additional air for circulation through the residence 502. When the temperature reaches the set point (with the removal of a relatively small tolerance), the unit can stop the refrigeration cycle temporarily.

In some embodiments, the system 500 configured so that the outdoor unit 504 is controlled to achieve a more elegant control over temperature and humidity within the residence 502. The outdoor unit 504 is controlled to operate components within the outdoor unit 504, and the system 500, based on a percentage of a delta between a minimum operating value of the compressor and a maximum operating value of the compressor plus the minimum operating value. In some embodiments, the minimum operating value and the maximum operating value are based on the determined outdoor ambient temperature, and the percentage of the delta is based on a predefined temperature differential multiplier and one or more time dependent multipliers.

Figure 6:
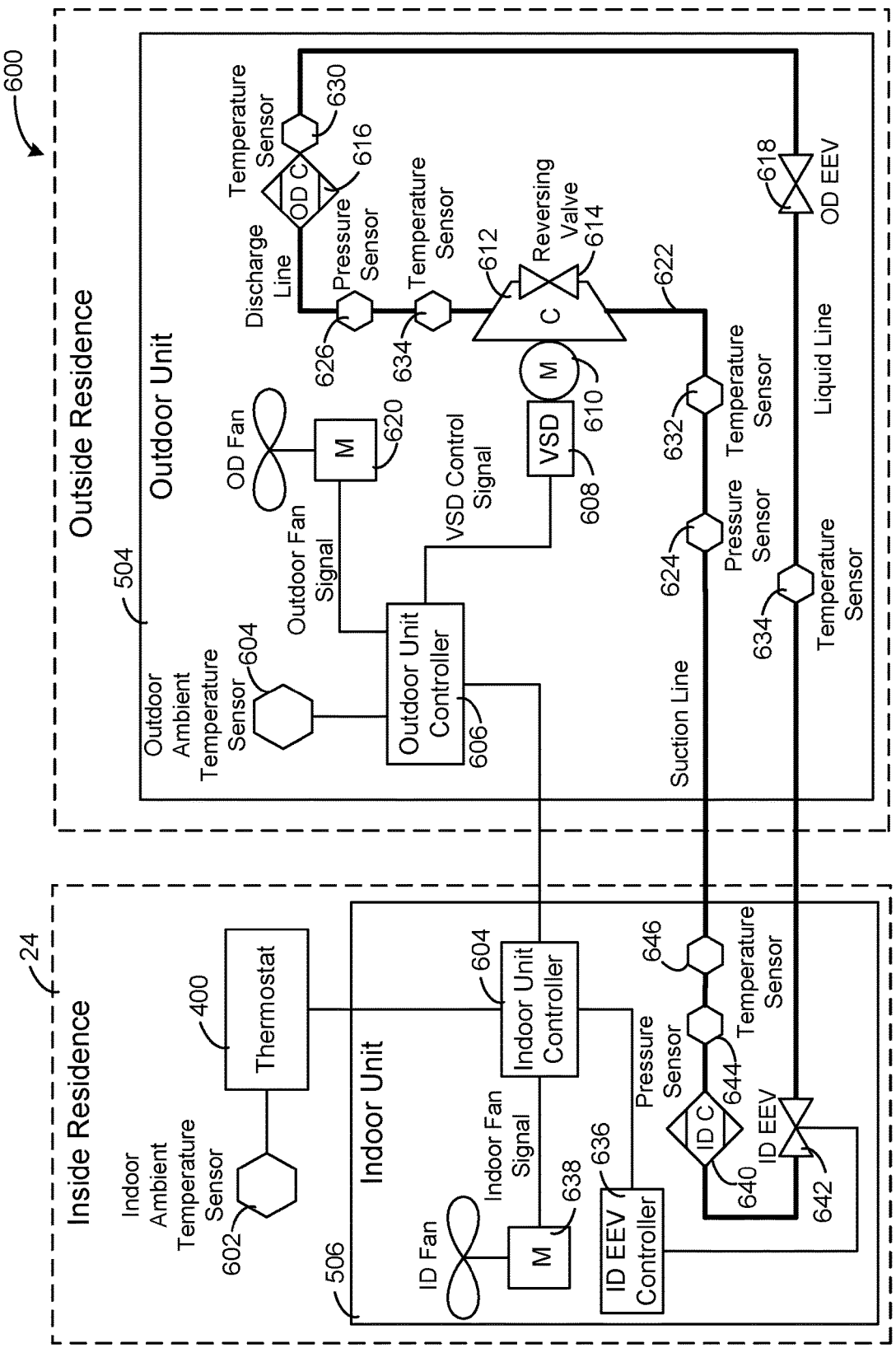
FIG. 6 is a schematic drawing of the thermostat and the residential heating and cooling system of FIG. 1A, according to an exemplary embodiment.

Referring now to FIG. 6, an HVAC system 600 is shown according to an exemplary embodiment. Various components of system 600 are located inside residence 502 while other components are located outside residence 502. Outdoor unit 504, as described with reference to FIG. 5, is shown to be located outside residence 502 while indoor unit 506 and thermostat 400, as described with reference to FIG. 6, are shown to be located inside the residence 502. In various embodiments, the thermostat 400 can cause the indoor unit 506 and the outdoor unit 504 to heat residence 502. In some embodiments, the thermostat 400 can cause the indoor unit 506 and the outdoor unit 504 to cool the residence 502. In other embodiments, the thermostat 400 can command an airflow change within the residence 502 to adjust the humidity within the residence 502.

Thermostat 400 can be configured to generate control signals for indoor unit 506 and/or outdoor unit 504. The thermostat 400 is shown to be connected to an indoor ambient temperature sensor 602, and an outdoor unit controller 606 is shown to be connected to an outdoor ambient temperature sensor 604. The indoor ambient temperature sensor 602 and the outdoor ambient temperature sensor 604 may be any kind of temperature sensor (e.g., thermistor, thermocouple, etc.). The thermostat 400 may measure the temperature of residence 502 via the indoor ambient temperature sensor 602. Further, the thermostat 400 can be configured to receive the temperature outside residence 502 via communication with the outdoor unit controller 606. In various embodiments, the thermostat 400 generates control signals for the indoor unit 506 and the outdoor unit 504 based on the indoor ambient temperature (e.g., measured via indoor ambient temperature sensor 602), the outdoor temperature (e.g., measured via the outdoor ambient temperature sensor 604), and/or a temperature set point.

The indoor unit 28 and the outdoor unit 504 may be electrically connected. Further, indoor unit 28 and outdoor unit 504 may be coupled via conduits 210. The outdoor unit 504 can be configured to compress refrigerant inside conduits 210 to either heat or cool the building based on the operating mode of the indoor unit 28 and the outdoor unit 504 (e.g., heat pump operation or air conditioning operation). The refrigerant inside conduits 210 may be any fluid that absorbs and extracts heat. For example, the refrigerant may be hydro fluorocarbon (HFC) based R-410A, R-407C, and/or R-134a.

The outdoor unit 504 is shown to include the outdoor unit controller 606, a variable speed drive 608, a motor 610 and a compressor 612. The outdoor unit 504 can be configured to control the compressor 612 and to further cause the compressor 612 to compress the refrigerant inside conduits 210. In this regard, the compressor 612 may be driven by the variable speed drive 608 and the motor 610. For example, the outdoor unit controller 606 can generate control signals for the variable speed drive 608. The variable speed drive 608 (e.g., an inverter, a variable frequency drive, etc.) may be an AC-AC inverter, a DC-AC inverter, and/or any other type of inverter. The variable speed drive 608 can be configured to vary the torque and/or speed of the motor 610 which in turn drives the speed and/or torque of compressor 612. The compressor 612 may be any suitable compressor such as a screw compressor, a reciprocating compressor, a rotary compressor, a swing link compressor, a scroll compressor, or a turbine compressor, etc.

In some embodiments, the outdoor unit controller 606 is configured to process data received from the thermostat 400 to determine operating values for components of the system 600, such as the compressor 612. In one embodiment, the outdoor unit controller 606 is configured to provide the determined operating values for the compressor 612 to the variable speed drive 608, which controls a speed of the compressor 612. The outdoor unit controller 606 is controlled to operate components within the outdoor unit 504, and the indoor unit 506, based on a percentage of a delta between a minimum operating value of the compressor and a maximum operating value of the compressor plus the minimum operating value. In some embodiments, the minimum operating value and the maximum operating value are based on the determined outdoor ambient temperature, and the percentage of the delta is based on a predefined temperature differential multiplier and one or more time dependent multipliers.

In some embodiments, the outdoor unit controller 604 can control a reversing valve 614 to operate system 600 as a heat pump or an air conditioner. For example, the outdoor unit controller 606 may cause reversing valve 614 to direct compressed refrigerant to the indoor coil 508 while in heat pump mode and to an outdoor coil 616 while in air conditioner mode. In this regard, the indoor coil 508 and the outdoor coil 616 can both act as condensers and evaporators depending on the operating mode (i.e., heat pump or air conditioner) of system 600.

Further, in various embodiments, outdoor unit controller can be configured to control and/or receive data from an outdoor electronic expansion valve (EEV) 518. The outdoor electronic expansion valve 518 may be an expansion valve controlled by a stepper motor. In this regard, the outdoor unit controller can be configured to generate a step signal (e.g., a PWM signal) for the outdoor electronic expansion valve 518. Based on the step signal, the outdoor electronic expansion valve 518 can be held fully open, fully closed, partial open, etc. In various embodiments, the outdoor unit controller 606 can be configured to generate step signal for the outdoor electronic expansion valve 518 based on a subcool and/or superheat value calculated from various temperatures and pressures measured in system 600. In one embodiment, the outdoor unit controller 606 is configured to control the position of the outdoor electronic expansion valve 518 based on a percentage of a delta between a minimum operating value of the compressor and a maximum operating value of the compressor plus the minimum operating value. In some embodiments, the minimum operating value and the maximum operating value are based on the determined outdoor ambient temperature, and the percentage of the delta is based on a predefined temperature differential multiplier and one or more time dependent multipliers.

The outdoor unit controller 606 can be configured to control and/or power outdoor fan 620. The outdoor fan 620 can be configured to blow air over the outdoor coil 616. In this regard, the outdoor unit controller 606 can control the amount of air blowing over the outdoor coil 616 by generating control signals to control the speed and/or torque of outdoor fan 620. In some embodiments, the control signals are pulse wave modulated signals (PWM), analog voltage signals (i.e., varying the amplitude of a DC or AC signal), and/or any other type of signal. In one embodiment, the outdoor unit controller 606 can control an operating value of the outdoor fan 620, such as speed, based on a percentage of a delta between a minimum operating value of the compressor and a maximum operating value of the compressor plus the minimum operating value. In some embodiments, the minimum operating value and the maximum operating value are based on the determined outdoor ambient temperature, and the percentage of the delta is based on a predefined temperature differential multiplier and one or more time dependent multipliers.

The outdoor unit 504 may include one or more temperature sensors and one or more pressure sensors. The temperature sensors and pressure sensors may be electrical connected (i.e., via wires, via wireless communication, etc.) to the outdoor unit controller 606. In this regard, the outdoor unit controller 606 can be configured to measure and store the temperatures and pressures of the refrigerant at various locations of the conduits 622. The pressure sensors may be any kind of transducer that can be configured to sense the pressure of the refrigerant in the conduits 622. The outdoor unit 504 is shown to include pressure sensor 624. The pressure sensor 624 may measure the pressure of the refrigerant in conduit 622 in the suction line (i.e., a predefined distance from the inlet of compressor 612). Further, the outdoor unit 504 is shown to include pressure sensor 626. The pressure sensor 626 may be configured to measure the pressure of the refrigerant in conduits 622 on the discharge line (e.g., a predefined distance from the outlet of compressor 612).

The temperature sensors of outdoor unit 504 may include thermistors, thermocouples, and/or any other temperature sensing device. The outdoor unit 504 is shown to include temperature sensor 630, temperature sensor 632, temperature sensor 634, and temperature sensor 636. The temperature sensors (i.e., temperature sensor 630, temperature sensor 632, temperature sensor 634, and/or temperature sensor 636) can be configured to measure the temperature of the refrigerant at various locations inside conduits 622.

Referring now to the indoor unit 506, the indoor unit 506 is shown to include indoor unit controller 604, indoor electronic expansion valve controller 636, an indoor fan 638, an indoor coil 640, an indoor electronic expansion valve 642, a pressure sensor 644, and a temperature sensor 646. The indoor unit controller 604 can be configured to generate control signals for indoor electronic expansion valve controller 642. The signals may be set points (e.g., temperature set point, pressure set point, superheat set point, subcool set point, step value set point, etc.). In this regard, indoor electronic expansion valve controller 636 can be configured to generate control signals for indoor electronic expansion valve 642. In various embodiments, indoor electronic expansion valve 642 may be the same type of valve as outdoor electronic expansion valve 618. In this regard, indoor electronic expansion valve controller 636 can be configured to generate a step control signal (e.g., a PWM wave) for controlling the stepper motor of the indoor electronic expansion valve 642. In this regard, indoor electronic expansion valve controller 636 can be configured to fully open, fully close, or partially close the indoor electronic expansion valve 642 based on the step signal.

Indoor unit controller 604 can be configured to control indoor fan 638. The indoor fan 238 can be configured to blow air over indoor coil 640. In this regard, the indoor unit controller 604 can control the amount of air blowing over the indoor coil 640 by generating control signals to control the speed and/or torque of the indoor fan 638. In some embodiments, the control signals are pulse wave modulated signals (PWM), analog voltage signals (i.e., varying the amplitude of a DC or AC signal), and/or any other type of signal. In one embodiment, the indoor unit controller 604 may receive a signal from the outdoor unit controller indicating one or more operating values, such as speed for the indoor fan 638. In one embodiment, the operating value associated with the indoor fan 638 is an airflow, such as cubic feet per minute (CFM). In one embodiment, the outdoor unit controller 606 may determine the operating value of the indoor fan based on a percentage of a delta between a minimum operating value of the compressor and a maximum operating value of the compressor plus the minimum operating value. In some embodiments, the minimum operating value and the maximum operating value are based on the determined outdoor ambient temperature, and the percentage of the delta is based on a predefined temperature differential multiplier and one or more time dependent multipliers.

The indoor unit controller 604 may be electrically connected (e.g., wired connection, wireless connection, etc.) to pressure sensor 644 and/or temperature sensor 646. In this regard, the indoor unit controller 604 can take pressure and/or temperature sensing measurements via pressure sensor 644 and/or temperature sensor 646. In one embodiment, pressure sensor 644 and temperature sensor 646 are located on the suction line (i.e., a predefined distance from indoor coil 640). In other embodiments, the pressure sensor 644 and/or the temperature sensor 646 may be located on the liquid line (i.e., a predefined distance from indoor coil 640).

Thermostat and Control Functionality

The preferred embodiments of the present disclosure will now be described with reference to FIG. 7a through FIG. 10.

Typically, a plurality of building equipment 400 which includes one or more edge devices, IoT enabled devices, sensing equipment, thermostats, and the like are deployed within a facility, a zone or a premises. Although, the associated figures depict thermostat 400 as the building equipment, it is to be understood the description is not restricted only to thermostats.

Figure 7A:
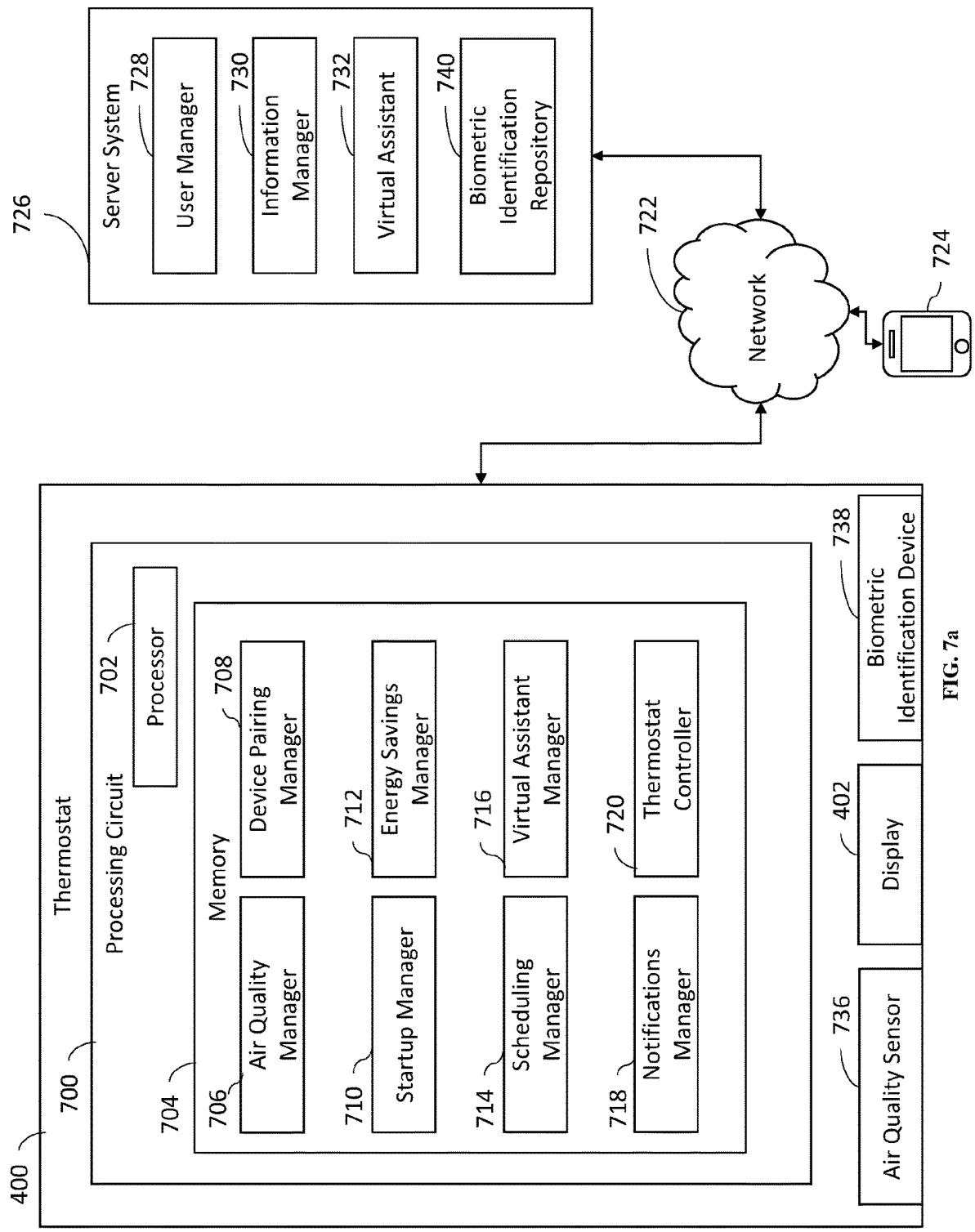
FIG. 7a is a block diagram of a system for controlling access to building equipment of a facility depicting thermostat as a building equipment in communication with a server and a user device, in accordance with an embodiment.
Figure 8:
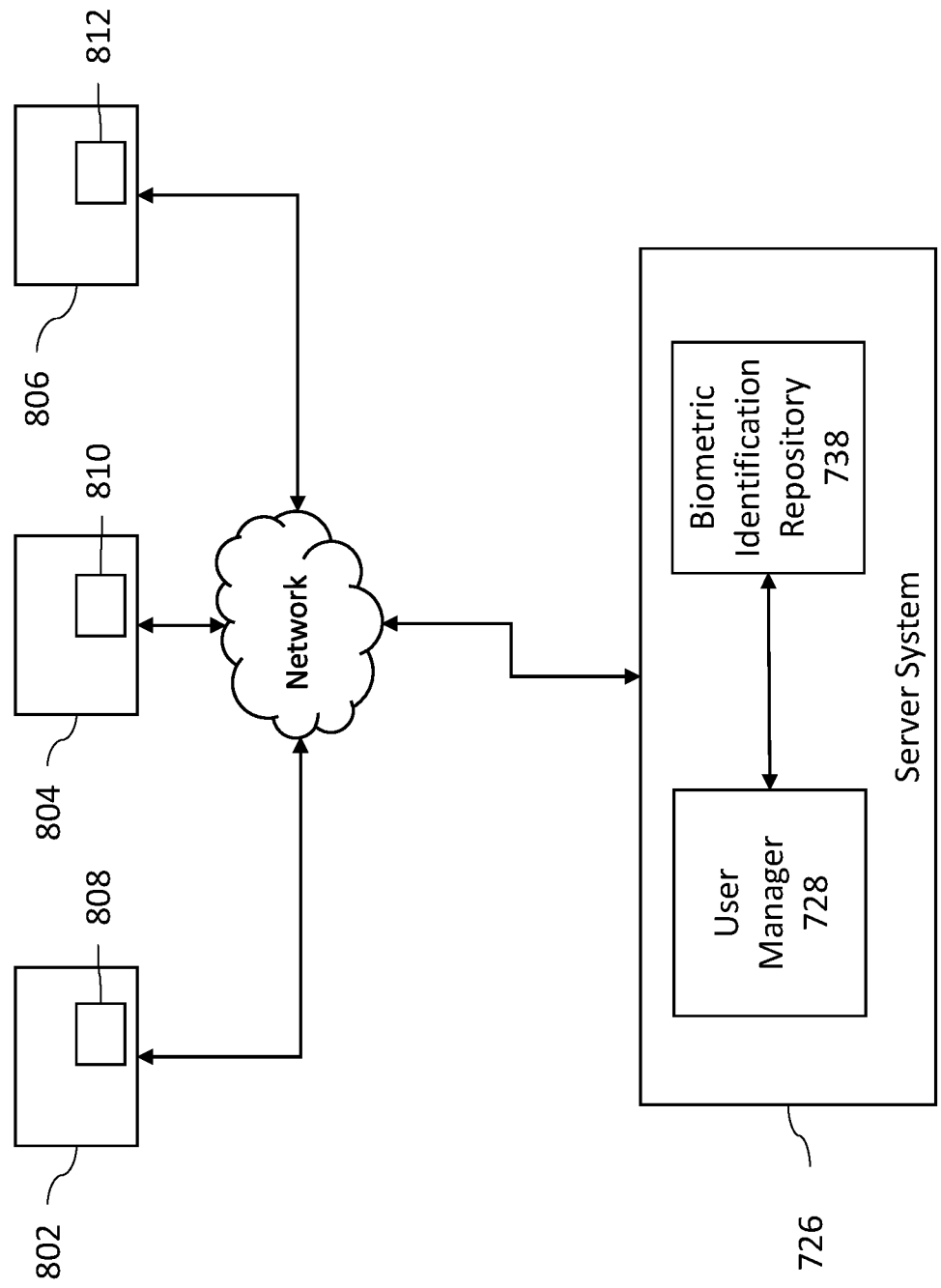
FIG. 8 is a block diagram of a facility management system with remote identification verification, according to an exemplary embodiment.

The facility management system, hereinafter also referred as "system for controlling access to building equipment", comprises a server 726, a biometric identification unit 738, and a processing circuit 700. Referring to FIG. 8, an exemplary facility is shown to include multiple zones or spaces 802-806. Each space or zone 802-806 may be located in on different floors of a single building. In an embodiment, each space or zone 802-806 may be located in a different building. In an embodiment, each zone 802-806 is configured to be controlled using a thermostat 808-812 respectively, such as a thermostat 400 described in conjunction with FIG. 4. The spaces or zones 802-806 may be utilized by a single entity such as an office or may be utilized by multiple different entities. For example, the facility may be an office facility or may be a shopping complex that may have multiple tenants. In an embodiment, the biometric identification unit 738 may be deployed at the entrance of the facility. In another embodiment, the biometric identification unit 738 may be housed within the thermostat 400 as shown in FIG. 7a. In still another embodiment, the biometric identification unit 738 may be located anywhere within the zone 802-806, and may be associated with the thermostat 400 associated with the corresponding zone.

According to some embodiment, one or more facility managers (hereinafter also referred as registered users or associated users) are assigned to install, configure, control, and maintain all building equipment, i.e., thermostat or environmental control devices, in the facility. The facility managers may be provided with access to the thermostats 802-806 through the interfaces provided by the server system 726 on the user device 724. The facility managers may be provided with access to the thermostats 808-812 depending on a plurality of parameters that include, but are not limited to, location of the thermostats or the facility manager's work hours. In some embodiments, the server system 726 enables the facility managers to register their biometric information against their respective profiles through interfaces provided on a portable electronic device 724. In an embodiment, the portable electronic device 724 has communication capabilities. On the user manager 728 at the server system 726, personal information of the facility manager, along with a level of access provided to the facility manager is stored.

Subsequent to registration, when the facility manager wishes to access the thermostats 808-812, he/she utilizes the biometric identification device 738 that is communicably coupled with one or more thermostats 400. The biometric identification information provided by the facility manager through the biometric identification device 738 is then communicated to the server system 726. The server system 726 includes the biometric identification repository 740, which is utilized to verify if the facility manager's biometric information is already available. If the information is not available with the server system, the server system 726 may be configured to present an error message on the thermostat's screen, i.e., display 402 indicating that the access desiring user is not registered and may not have access to the thermostat he/she wishes to access. In another embodiment, if the information collected from the facility manager at one of the thermostat's 808-812 matches with information stored in the biometric information repository 740, the server system 726 is configured to identify the facility manager's credentials. Further, the server system 726 is configured to identify the thermostats from the thermostats 808-812 that the facility manager has access to. This information may be available with the user manager 728 and may be collected during the registration of the facility manager on the server system 726.

Post authentication, the server system 726 is configured to provide access to the facility manager based on the level of access that has been approved for that particular facility manager.

In addition, the server system 726 may also be configured to provide interfaces to allow users to be registered to access one or more of the thermostats 808-812 for a specific period of time. Post expiry of the specific period of time, the server system 726 may be configured to delete biometric information of the user from the biometric information repository 740.

In accordance with an implementation of the present disclosure, the server 726 is configured to store a list of registered users, and one or more biometric information and access rights corresponding to each of the registered users (also referred as facility managers). The biometric identification unit 738 (also referred as biometric identification device) is associated with the building equipment 400, i.e., thermostat. In one embodiment, a single biometric identification unit 738 is associated with multiple building equipment 400. In another embodiment, the system includes a plurality of biometric identification units 738 wherein the biometric identification unit is associated with the building equipment 400 in one to one correspondence. In still another embodiment, the biometric identification unit 738 is integral to the building equipment 400. In yet another embodiment, the biometric identification unit 738 is implemented using the portable electronic device 724.

The biometric identification unit 738 is enabled to facilitate a user, desiring access to the associated building equipment 400, to scan at least one biometric parameter, and is further configured to generate scanned biometric information.

The processing circuit 700 is associated with the building equipment 400, and is communicatively coupled with the server 726 and the biometric identification unit 738. In an embodiment, the processing circuit 700 is housed within the building equipment 400. The processing circuit 700 is configured to: authenticate the user based on the biometric information of the registered users contained within the server 726 and the scanned biometric information received from the biometric identification unit 738; determine access rights for the authenticated user; and provide access to the authenticated user to operate the associated building equipment based on the determined access rights. In an embodiment, the authenticated user may be granted access to one or more building equipment based on the determined access rights.

In accordance with an embodiment of the present disclosure, the processing circuit 700 comprises a memory 704, a processor 702, a data comparator 902, a data extractor 904, and a data analyzer 906. The memory 704 is configured to store a pre-determined set of instructions. The memory 704 may include one or more devices (e.g., memory units, memory devices, storage devices, etc.) for storing data and/or computer code for completing and/or facilitating the various processes described in the present disclosure. The memory may include random access memory (RAM), read-only memory (ROM), hard drive storage, temporary storage, non-volatile memory, flash memory, optical memory, or any other suitable memory for storing software objects and/or computer instructions. Memory may include database components, object code components, script components, or any other type of information structure for supporting the various activities and information structures described in the present disclosure. Memory 704 may be communicably connected to the processor 702 via the processing circuit 700 and may include computer code for executing (e.g., by the processor) one or more processes described herein. When processor executes instructions stored in the Memory for completing the various activities described herein, processor generally configures the processing circuit and its modules/unit to complete such activities. Specifically, the processor 702 is enabled to receive the set of instructions stored within the memory 704, and generate a set of processing commands based on the pre-determined set of instructions.

The data comparator 902, the data extractor 904, and the data analyzer 906 are communicatively coupled with the processor 702, and are further configured to perform desired functionality under the influence of the set of processing commands generated by the processor 702. In an embodiment, the data comparator 902, the data extractor 904, and the data analyzer 906 are implemented using one or more processor(s) which may be separate processor or the processor 702 configured to generate the processing commands.

The data comparator 902 is configured to receive the scanned biometric information, and is further configured to access the list of registered users stored in the server 726. The data comparator 902 is configured to tag a registered user whose biometric information stored in the server 726 matches with the scanned biometric information. Further, the data extractor 904 is configured to extract the access rights corresponding to the tagged user. The data analyzer 906 is configured to cooperate with the data extractor 904 to receive the extracted access rights, and is further enabled to analyze the extracted access rights, based on the processing commands, to determine the level of access that is to be permitted to the tagged user which is the authenticated user.

In an embodiment, the access rights and the level of access permitted to the tagged user may define access to one or more of temperature settings, an air quality manager 706, a schedule manager 714, an energy saving manager 712, a thermostat controller 720, a pairing manager 708, and a notification manager 718.

In accordance with an embodiment of the present disclosure, the processor 702 is enabled to store a record of previously authorized users in the memory 704. The record of previously authorized user contains one or more biometric information and access rights corresponding to each of the previously authorized users. Additionally, the processor 702 is enabled to update the access rights for each of the previously authorized users by periodically establishing communication link with the server 726, wherein the communication link is established via a communication interface of the associated building equipment. The advantage of storing details pertaining to the previously authorized user(s) result in reduced turnaround time for the processing circuit 700 to provide access to the already authorized user.

In an embodiment, the biometric identification unit 738 may comprise at least one of a fingerprint scanner, a face scanner, an iris scanner, a voice recognizer, and a palm scanner. The biometric identification unit 738 may be enabled to scan fingerprint, face, iris, voice, and palm of the user as biometric parameters for determining authenticity of the user desiring access.

In some embodiment, the thermostat 400 includes the display 402 that is communicatively coupled with the processing circuit 700, and is further configured to display either an error message or an authentication success message. The processor 702 is configured to generate either an error signal or a success signal. The error signal indicates an unauthorized user, wherein the error signal is generated when the scanned biometric information is not associated with one of the listed registered users. Further, the success signal is generated when the scanned biometric information is associated with one of the listed registered users. The display based on the generation of error signal is enabled to display the error message and based on the success signal is enabled to display authentication success message.

In an embodiment, the biometric identification unit 738 may be implemented as a biometric identification device, and may be positioned at the entrance of the zone or floor or facility 802-806.

Figure 7B:
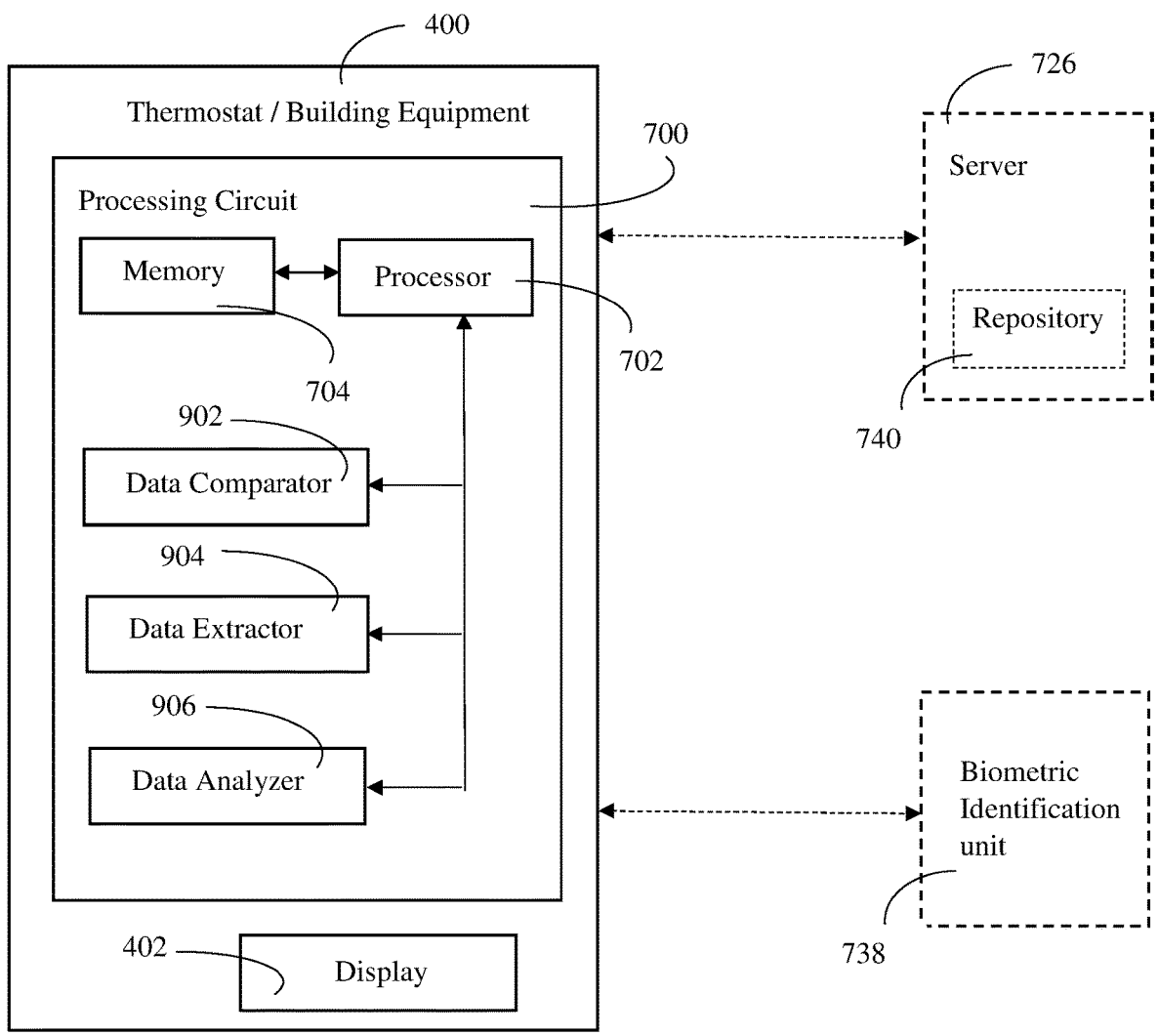
FIG. 7b is a block diagram of a system for controlling access to building equipment of a facility, in accordance with another embodiment of the present disclosure.

Referring specifically to FIGS. 7a and 7b, the thermostat 400 of FIG. 4 is shown in greater detail, according to an exemplary embodiment. Furthermore, the server 726 and the user device 724 (also referred as portable electronic device) are shown in FIG. 7 communicating with the thermostat 400 via a network 722. Each of the thermostat 400, the server 726, and/or the user device 724 can be configured to communicate (e.g., send and/or receive data) among each other via the network 722. In an embodiment, the user device 724 is selected from a smartphone, a tablet, a laptop computer, a desktop computer, and the like for reviewing interfaces and receiving user input. In some embodiments, the network 722 is at least one of and/or a combination of a mesh network, Wi-Fi network, a wired Ethernet network, a Zigbee network, a Bluetooth network, and/or any other wireless and/or wired network. The network 722 may be a local area network and/or a wide area network (e.g., the Internet, a building WAN, etc.) and may use a variety of communications protocols (e.g., BACnet, IP, LON, etc.). The network 722 may include routers, modems, and/or network switches. The network 722 may be a combination of wired and wireless networks.

The thermostat 400 is shown to include a processing circuit 700 including a processor 702, and a memory 704. The processor 702 can be implemented as a general purpose processor, an application specific integrated circuit (ASIC), one or more field programmable gate arrays (FPGAs), a group of processing components, or other suitable electronic processing components. The memory 704 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. The memory 704 can be or include volatile memory or non-volatile memory. The memory 704 can include object code components, script components, or any other type of information structure for supporting the various activities and information structures described in the present application. According to some embodiments, the memory 704 is communicably connected to the processor 702 via the processing circuit 700 and can include computer code for executing (e.g., by the processing circuit 700 and/or the processor 702) one or more processes and/or functionalities described herein.

In an embodiment, the memory 704 is shown to include an air quality manager 706. The air quality manager 706 is configured to communicate with an air quality sensor 736 of the thermostat 400 to receive indoor air quality data. The indoor air quality data can include humidity, relative humidity, volatile organic compounds (VOCs), carbon dioxide ($CO_2$), an air quality index (AQI), and/or any other data shown or described herein that is associated with a building that the thermostat 400 is located within.

Furthermore, the air quality manager 706 can be configured to receive outdoor air quality data from the server 726. The air quality manager 706 can be configured to receive air quality data for particular regions (e.g., cities, states, countries, etc.). The air quality manager 706 can be configured to communicate a geographic region, e.g., a zip code, a state name, a city name, etc. to the server and receive air quality data for said area from the server. In some embodiments, the air quality manager 706 can receive outdoor air quality data from an outdoor air quality sensor communicably coupled to the thermostat 400 via the network 722. In this regard, a user can install an outdoor air quality sensor outside their home. The outdoor air quality sensor may be a wireless air quality sensor that can communicate to the thermostat 400 and provide the thermostat 400 with outdoor air quality data. An example of a thermostat that utilizes air quality index is shown in U.S. patent application Ser. No. 15/951,761 filed Apr. 12, 2018, the entirety of which is incorporated herein.

Based on the indoor air quality data and the outdoor air quality data, the air quality manager 706 can be configured to generate interfaces and display the generated user interfaces on the display 402 for communicating air quality conditions to a user.

The startup manager 710 is shown to be included in the memory 704. The startup manager 710 can be configured to facilitate an initial installation of the thermostat 400 with building equipment, e.g., the building equipment discussed with reference to FIGS. 1-3 and 5-6 and gathering information for operating the thermostat (e.g., logon to networks, receive a user schedule, etc.). The startup manager 710 can be configured to detect wiring inputs at various wiring terminals via a wiring detection circuit. An example of a thermostat with wiring terminals that can be configured to provide interacting thermostat installation features is shown in U.S. patent application Ser. No. 15/473,142 Filed Mar. 29, 2017, the entirety of which is incorporated by reference herein.

The scheduling manager 714 can be configured to generate operational schedules for the thermostat 400 that can allow the thermostat 400 to heat and/or cool a building based on the generated schedules. The scheduling manager 714 can be configured to generate questions which prompt the user to enter scheduling data. The scheduling manager 714 can be configured to generate a primary schedule, a first schedule, which can serves as a basis for heating and/or cooling operation of the thermostat 400. Furthermore, the scheduling manager 714 can receive secondary scheduling data. The secondary scheduling data may be various occupied and/or non-occupied defined periods in a day. An example of a thermostat that can be configured to factor occupancy in scheduling is shown in U.S. patent application Ser. No. 15/336,793 filed Oct. 28, 2016, the entirety of which is incorporated herein. Based on the first and second schedules, the scheduling manager 714 can be configured to operate building equipment.

The notifications manager 718 can be configured to generate notifications for the thermostat 400. The notifications may indicate that the thermostat 400 and/or equipment attached to the thermostat require user attention. A notification may indicate that indoor and/or outdoor air quality is poor, equipment is not properly functioning, a filter needs to be replaced, etc.

The memory 704 is shown to include the device pairing manager 708. The device pairing manager 708 can be configured to generate (e.g., pseudo-randomly generate) a device pairing key and cause the display 402 to display the device pairing key. The device pairing manager 708 can be configured to facilitate a network connection with the user device 724 based on the user entering the displayed device pairing key into the user device 724.

The energy savings manager 712 is shown to be included by the memory 704. The energy savings manager 712 can be configured to determine an amount of energy savings, generate a user interfaces for the energy savings, and the display 402 to display the indications of energy savings. The energy savings manager 712 can be configured to record an actual equipment runtime of the thermostat 400 based on how long the thermostat 400 causes heating and/or cooling equipment to operate.

The energy savings manager 712 can generate and train predictive models of the thermostat 400, the building that the thermostat 400 is located within, and/or the equipment which the thermostat 400 controls. The energy savings manager 712 can be configured to determine a predicted runtime that would occur if the thermostat 400 did not utilize various energy savings operational and/or scheduling features.

Based on the actual runtime and the predicted ("baseline") runtime, the energy savings manager 712 can be configured to generate the energy savings interfaces. The energy savings manager 712 can determine energy savings the same as, and/or similar to, the thermostat of discussed in U.S. Provisional Patent Application No. 62/595,757 filed Dec. 7, 2017, the entirety of which is incorporated by reference herein. The energy savings manager 717 can be configured to generate the energy savings interfaces shown and described in U.S. Provisional Patent Application 62/595,757 filed Dec. 7, 2017.

The memory 704 is shown to include a virtual assistant manager 716. The virtual assistant manager 716 can be configured to integrate the thermostat 400 with a virtual assistant via the server system 726. A virtual assistant, e.g., the virtual assistant 732 of the server system 726, can be a bot configured to integrate natural language processing with the thermostat 400. The virtual assistant 732 can be a virtual assistant e.g., CORTANA and/or SIRI. The virtual assistant manager 716 can be configured to receive typed or spoken data (e.g., via the display 402 and/or a microphone), and provide the data to the virtual assistant 732 via the network 722. The virtual assistant manager 716 can receive information from the server system 726 based on the transmitted data to the server system 726. For example, a user may speak "What is the weather forecast for my city?" to the thermostat 400. This spoken data, and/or data indicative of the spoken data (e.g., a text translation of the spoken data) to the virtual assistant 732. The virtual assistant 732 can be configured to determine the weather forecast for the city and cause the thermostat 400 to display the weather forecast. In some embodiments, the virtual assistant 732 identifies a web page or web page excerpt and causes the display 402 of the thermostat 400 to display the web page or excerpts from the web page.

The memory is shown to include a thermostat controller 720. The thermostat controller 720 can be configured to control building equipment connected to the thermostat 400. In some embodiments, the thermostat controller 720 can be configured to cause an audio device (e.g., an audio device of the thermostat 400 or an audio device connected to the thermostat 4090) to play music. Furthermore, the thermostat controller 720 can be configured to perform various temperature control commands. The thermostat controller 720 can be configured to receive setpoint hold commands. A hold command may be a command to hold a particular setpoint for a predefined amount of time before reverting to a schedule. For example, a user could adjust a setpoint temperature from a schedule setpoint to a manual setpoint and press a two hour hold command. The thermostat controller 720 can be configured to operate the equipment connected to the thermostat 400 based on the manual setpoint for the two hour period after which, the thermostat controller 720 can be configured to revert to the schedule setpoint.

In accordance with an embodiment of the present disclosure, FIGS. 7a and 7b is shown to include the biometric identification unit 738. Examples of the biometric identification unit 738 include, but are not limited to, a fingerprint reader, an iris scanner, a face recognizer, a voice recognizer, a palm scanner, and the like. The biometric identification unit 738 is communicably coupled with processor 702 and the server 726. In some embodiments, the biometric identification unit 738 is utilized to identify the user accessing the thermostat 400. Upon successful identification of the user, the processor 702 allows the user to access functions of the thermostat 400 such as air quality manager 706, device pairing manager 708, startup manager 710, energy savings manager 712, scheduling manager 714, virtual assistant manager 716, and thermostat controller 720.

The biometric identification device 738 may be housed such that it is physically coupled with the thermostat 400. In some embodiments, the biometric identification device 738 may be located remotely, with respect to the thermostat 400. The thermostat 400 and the biometric identification device 738 communicate with each other through wired or wireless communication networks. The biometric identification device 738 is also coupled to the server 726 through wired or wireless communication network.

In an embodiment, the fingerprint reader may be an optical fingerprint scanner, a capacitive fingerprint scanner, an ultrasound/ultrasonic fingerprint sensor, a thermal line sensor, and the like. The fingerprint reader is communicably coupled with the server system 726 that is configured to verify whether the user attempting to access the thermostat 400 is authorized to do so.

Still further, FIGS. 7a and 7b is shown to include the server 726. The server 726 can include one or multiple processing circuits configured to perform the functional operations for the server 726. The server 726 can include a user manager 728, an information manager 730, a virtual assistant 732, and a biometric information repository 740, specifically shown in FIG. 7a. The server 726 can be configured to work with the user device 724 to display interfaces to the user. In some embodiments, the server system 726 can be configured to cause a web browser of the user device 724 to display an interface. In some embodiments, the server system 726 can cause a mobile application running on the user device 724 to display certain information provided to the user device 724 by the server system 726.

The user manager 728 can be configured to manage various user accounts and the access levels which each account is associated with. In some embodiments, the user manager 728 generates a master account for a master user and allows master account to add other user accounts and give those user accounts the ability to control the thermostat 400. In some embodiments, the user manager 728 may also include the biometric identification repository 740.

The information manager 730 can be configured to provide installation information and/or specification information for the thermostat 400 to an end user. In some embodiments, the thermostat 400 is associated with a Quick Response (QR) Code. For example, the QR code may be an adhesive QR code located on an enclosure of the thermostat 400, a printed QR code on the enclosure of the thermostat 400, and/or located on a box of the thermostat 400. In some embodiments, the thermostat 400 can cause the display 402 to display the QR code.

If the user scans the QR code with a scanner (e.g., a camera) of the user device 724, the user device 724 may be configured to navigate to a link to download an application and/or display a particular web page. The application and/or web page may display various specification information for the thermostat 400.

In some embodiments, the server system 726 presents a user registration interface on the user device 724. The user registration interface may be configured to collect personal information of an end user that is being added to the approved users' list for the thermostat 400. In addition, the user registration interface may also provide an interface for the end user to store her/his biometric credentials. The user registration interface may utilize the biometric identification device 738 or any biometric identification device that is communicably coupled with the user device 724 to collect this biometric information. The biometric information is then stored in the biometric identification repository 740.

The biometric identification repository 740 is configured to store biometric identification information for all users that are authenticated to use the thermostat 400. The biometric information stored in the repository 740 is used to compare the scanned biometric information obtained by the biometric identification device 738. If the scanned biometric information obtained by the biometric identification device 738 matches any entry in the repository 740, a corresponding user created using the user manager 728 is determined. A level of access for the user is identified using the user manager 728 and appropriate features of the thermostat 400 are enabled.

In accordance with another implementation of the present disclosure, the system for controlling access to one or more building equipment 400 located within a building is envisaged. The system comprises the biometric identification unit 738 which is associated with a building equipment 400, and is configured to scan at least one biometric parameter of the user desiring access to the associated building equipment 400. Subsequent to scanning of the biometric parameter of the user desiring access, the biometric identification unit 738 is enabled to generate the scanned biometric information. Further, the system includes the processing circuit 700 associated with the building equipment 400, and is communicatively coupled with the biometric identification unit 738. In an embodiment, the processing circuit 700 is a separate processing circuit that is housed within the building equipment 400 or the processing circuit 700 corresponds to the processing circuit of the building equipment itself. The processing circuit 700 is configured to: store a list of associated users having access to the building equipment, and one or more biometric information and access rights corresponding to each of the associated users; authenticate the user based on the biometric information corresponding to the list of associated users and the scanned biometric information; and determine access rights for the authenticated user and provide access to the authenticated user to operate the building equipment based on the determined access rights.

In one embodiment, the processing circuit 700 comprises a memory 704, a processor 702, a data comparator 902, a data extractor 904, and a data analyzer 906.

The memory 704 is configured to store a list of associated users having access to the building equipment, and one or more biometric information and access rights corresponding to each of the associated users, and a pre-determined set of instructions. The processor 702 is configured to cooperate with the memory 704, and is further configured to generate a set of processing commands based on the pre-determined set of instructions. The data comparator 902, under the set of processing commands, is configured to receive the scanned biometric information, and is further configured to tag an associated user when the biometric information stored in the memory 704 matches with the scanned biometric information. The data extractor 904, under the set of processing commands, is configured to extract the access rights corresponding to the tagged user. The data analyzer 906 is configured to cooperate with the data extractor 904, and under the set of processing commands is configured to analyze the extracted access rights to determine the level of access to be permitted to the tagged user.

In an embodiment, the data comparator 902, the data extractor 904, and the data analyzer 906 each are implemented using one or more processor(s).

In accordance with an embodiment of the present disclosure, the system includes a server 726 configured to store a master list of users, and affiliated one or more building equipment, one or more biometric information and access rights corresponding to each of the users. The server 726 is configured to periodically update the list of associated users, and one or more biometric information and access rights corresponding to each of the associated users stored within each of the building equipment. In an embodiment, the server 726 is enabled to periodically update building equipment based on the affiliated building equipment stored in the server 726.

In accordance with an embodiment of the present disclosure, the server 726 is selected from the group consisting of an on-premises server, a remote server, and a cloud based server.

In some embodiment, the access rights include access to temperature setting, an air quality manager, a schedule manager, an energy saving manager, a thermostat controller, a pairing manager, and a notification manager. Still further, the access rights may also define restricted access, i.e., the user may be a registered user but have restricted or terminated access, wherein the user may not be allowed to control the building equipment 400.

In an embodiment, the facility manager may be allowed to update the list of registered and/or associated users, wherein the facility manager is enabled to update the access rights for each of the user via the interface provided by the server. In another embodiment, the system is configured to facilitate the facility manager to periodically update the access rights for each of the registered users via a portable electronic device or a non-portable electronic device having communication capabilities.

In an embodiment, the biometric identification unit 738 is implemented using a portable electronic device.

In an embodiment, the processing circuit 700 is enabled to grant access rights based on the determined access level, for a pre-defined time period. In one embodiment, the authenticated user may be provided access to all building equipment to which he is authorized to operate subsequent to successful authentication and/or authorization.

In accordance with another aspect of the present disclosure, a system for controlling access to a building equipment is envisaged. The system comprises one or more portable electronic device 724 associated with a registered user, and is enabled to facilitate the user to provide input pertaining to the selection of one or more building equipment 400 to be accessed. In an embodiment, the portable electronic device 724 may be enabled to interact with a server 726, wherein and the server 726 is enabled to graphically display one or more building equipment 400 for selection on the portable electronic device 724. The displayed one or more building equipment correspond to the building equipment to which the user associated with the portable electric device is authorized to control.

Subsequent to the selection of one or more building equipment, the portable electronic device 724 is enabled to scan at least one biometric parameter of the user, and generate scanned biometric information. In this implementation, the biometric identification unit 738 is implemented via the portable electronic device 724. The server 726 is communicatively coupled with the portable electronic device 724, and is enabled to receive the scanned biometric information and the selected building equipment information from the portable electronic device 724. In an embodiment, the server 726 comprises a repository and a processing circuit. The repository is configured to store: a list of registered users, and one or more biometric information, associated one or more building equipment, and access rights for the building equipment corresponding to each of the registered users.

The processing circuit is communicatively coupled with the repository, and is further configured to: authenticate the user based on the biometric information corresponding to the list of registered users and the scanned biometric information; determine access rights of the authenticated user for the selected building equipment; and provide access to the authenticated user to operate the selected building equipment remotely via the portable electronic device, based on the determined access rights.

Further, the processing circuit is enabled to generate an access control signal subsequent to determining the access rights of the authenticated user for the selected building equipment, and based on the generated access control signal the server is enabled to display the selected building equipment virtually on the portable electronic device thereby enabling the user to control the building equipment.

In an embodiment, the server is configured to partially display the building equipment virtually based on the generated access control signal, thereby providing restricted access to the user.

Method for Controlling Access to Building Equipment

Figure 9:
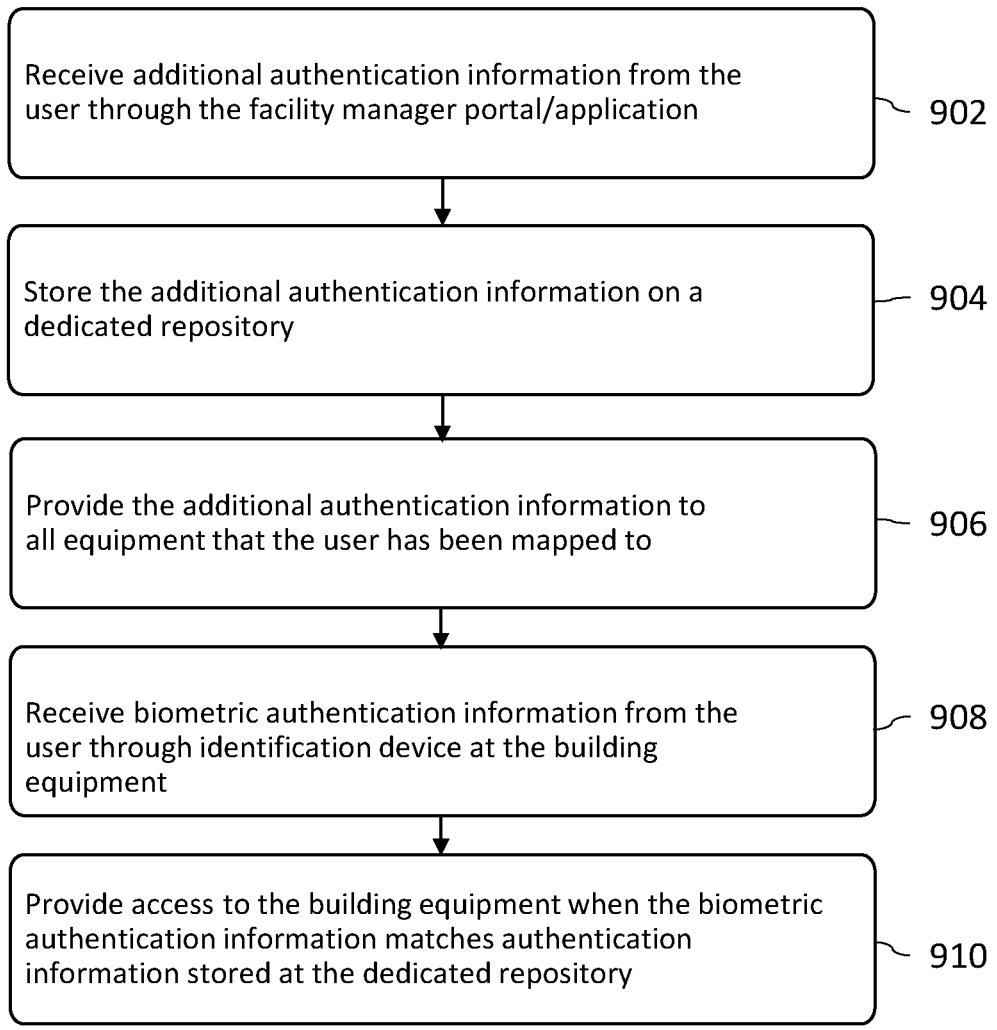
FIG. 9 is a flowchart of a method for controlling access to building equipment of a facility, in accordance with an embodiment of the present disclosure.

FIG. 9 shows a method for providing remote identification of users on building equipment, such as thermostat 400. The method includes, at step 902, utilizing a facility management portal/application that is operated through a user device to receive user credentials. User credentials, in some embodiments, may be one or more of user identification-password combination, fingerprint scan, iris scan, face scan, a visual pattern, and the like. Post successful authentication of the user, the facility management portal/application is configured to receive inputs from a facility manager pertaining to the spaces assigned to the authenticated user. After mapping one or more spaces to the authenticated user, the facility management portal/application prompts the authenticated user to provide additional authentication information. Additional authentication information, includes but is not limited to, fingerprints, iris, face, and the like. At step 904, the additional authentication information is sent to a dedicated repository on the cloud or a remote server. At step 906, the additional authentication information is pushed through to all the building equipment that the authenticated user has access to. The information, in one embodiment, may be pushed through to the building equipment using services such as IoT message brokering services. At step 908, when the user tries to access the building equipment at a space, the user is prompted to provide biometric authentication information. In some embodiments, the user is prompted through a voice message, or an alarm, or a visual indicator. When the user provides his/her biometric authentication information through the biometric identification device at the building equipment, the information is sent to the server system (cloud or remote server) for verification. At step 910, the biometric authentication information is compared with the stored additional authentication information. If the information matches with the stored information for that particular building equipment, the user is provided access to the building equipment.

Figure 10:
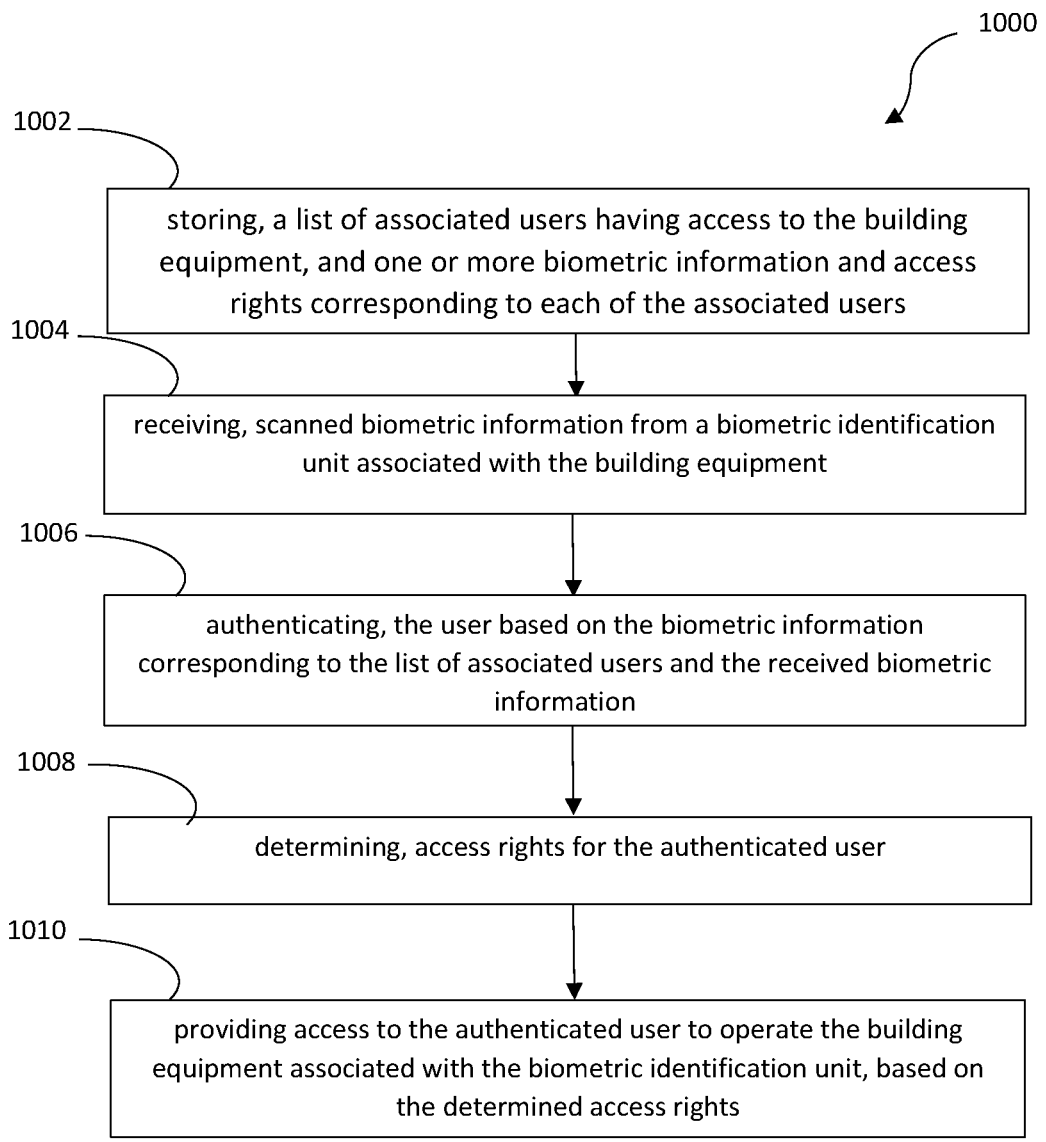
FIG. 10 is a flowchart of a method for controlling access to building equipment of a facility.

Referring to FIG. 10, the present disclosure envisages a method for controlling access to building equipment. The method comprises the steps performed by a processing circuit associated with a building equipment. The method comprises the step of storing (at step 1002), a list of associated users having access to the building equipment, and one or more biometric information and access rights corresponding to each of the associated users. In an embodiment, the associated users correspond to users having access to the building equipment. It is to be understood that the list of associated users is a subset of the list of registered users, wherein in one embodiment only a set of registered users may have access to a particular building equipment.

Subsequently, the method include the steps of receiving, at step 1004, scanned biometric information from a biometric identification unit associated with the building equipment. At step 1006, authenticating, the user based on the biometric information corresponding to the list of associated users and the received biometric information; determining, access rights (at step 1008) for the authenticated user; and at step 1010, providing access to the authenticated user to operate the building equipment associated with the biometric identification unit, based on the determined access rights.

In one embodiment, the processing circuit 700 comprises a memory 704, a processor 702, a data comparator 902, a data extractor 904, and a data analyzer 906 as described in the aforementioned description.

The memory 704 is configured to store a list of associated users having access to the building equipment 400, and one or more biometric information and access rights corresponding to each of the associated users, and a pre-determined set of instructions. The processor 702 is configured to cooperate with the memory 704, and is further configured to generate a set of processing commands based on the pre-determined set of instructions. The data comparator 902, under the set of processing commands, is configured to receive the scanned biometric information, and is further configured to tag an associated user when the biometric information stored in the memory 704 matches with the scanned biometric information. The data extractor 904, under the set of processing commands, is configured to extract the access rights corresponding to the tagged user. The data analyzer 906 is configured to cooperate with the data extractor, and under the set of processing commands is configured to analyze the extracted access rights to determine the level of access to be permitted to the tagged user.

In an embodiment, the data comparator, the data extractor, and the data analyzer are implemented using one or more processor(s).

In one embodiment, the processing circuit 700 is configured to perform a step of periodically establishing a communication link with a server to receive and store an updated list of associated users having access to the building equipment, and one or more biometric information and access rights corresponding to each of the associated users.

In another embodiment, the processing circuit 700 is configured to provide a notification indicating at least one of successful authentication and unsuccessful authentication.

In an embodiment, the access rights include access to one or more of temperature setting, an air quality manager, a schedule manager, an energy saving manager, a thermostat controller, a pairing manager, and a notification manager. In one embodiment, the building equipment is a thermostat, as described with reference to the preceding figures.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

We claim:

1. A system for controlling access to building equipment, said system comprising:
   a server configured to store a list of registered users, and one or more biometric information and access rights corresponding to each of said registered users;
   a biometric identification unit associated with the building equipment, said biometric identification unit is enabled to facilitate a user desiring access to the building equipment to scan the user for at least one biometric parameter, and further configured to generate scanned biometric information; and
   a processing circuit associated with the building equipment, and communicatively coupled with the server and the biometric identification unit, said processing circuit is configured to:
   authenticate the user based on the biometric information contained within the server and the scanned biometric information;
   determine access rights for the authenticated user; and
   provide access to the authenticated user to operate the building equipment based on the determined access rights, wherein the access rights for the authenticated user define access to a pairing manager, and one or more of an air quality manager, a schedule manager, and an energy saving manager, wherein the pairing manage is configured to provide a device pairing key, wherein the building equipment is a thermostat.

2. The system as claimed in claim 1, wherein said processing circuit comprises:
   a memory configured to store a pre-determined set of instructions;
   a processor configured to cooperate with the memory, and further configured to generate a set of processing commands based on the pre-determined set of instructions;
   a data comparator, under the set of processing commands, configured to receive the scanned biometric information, and is further configured to access the list of registered users stored in said server, wherein the data comparator is configured to tag a registered user when the biometric information stored in the server matches with the scanned biometric information;

a data extractor, under the set of processing commands, configured to extract the access rights corresponding to the tagged user; and a data analyzer configured to cooperate with the data extractor, and under the set of processing commands is configured to analyze the extracted access rights to determine a level of access to be permitted to said tagged user, wherein the data comparator, the data extractor, and the data analyzer are implemented using one or more processor(s).

3. The system as claimed in claim 1, wherein the processing circuit is configured to generate either one of:

a. an error signal indicating an unauthorized user when the scanned biometric information is not associated with one of the listed registered users; and b. a success signal indicating an authorized user when the scanned biometric information is associated with one of the listed registered users.

4. The system as claimed in claim 3, wherein said building equipment includes a display communicatively coupled with the processing circuit, and is further configured to either display an error message subsequent to reception of the error signal or an authentication successful message subsequent to reception of the success signal.

5. The system as claimed in claim 1, wherein the biometric identification unit comprises at least one of a fingerprint scanner, a face scanner, an iris scanner, a voice recognizer, and a palm scanner.

6. The system as claimed in claim 2, wherein the processor is enabled to store a record of previously authorized users in the memory, wherein the record of previously authorized user contains one or more biometric information and access rights corresponding to each of said previously authorized users.

7. The system as claimed in claim 6, wherein the processor is enabled to update the access rights for each of the previously authorized users by periodically establishing a communication link with the server, wherein the communication link is established via a communication interface of the building equipment.

8. The system as claimed in claim 1, wherein the access rights define access to all of the air quality manager, the schedule manager, the energy saving manager, and all the pairing manager.

9. The system as claimed in claim 1, wherein thermostat is provided with the biometric identification unit.

10. The system as claimed in claim 1, wherein the biometric identification unit is positioned at an entrance of any one of zone, facility, and floor.

11. A system for controlling access to building equipment located within a building, the system comprising:

a biometric identification unit associated with the building equipment, and configured to scan a user for at least one biometric parameter of the user desiring access to the building equipment, and further configured to generate scanned biometric information; and a processing circuit associated with the building equipment, and communicatively coupled with said biometric identification unit, said processing circuit configured to:

store a list of associated users having access to said building equipment, and one or more biometric information and access rights corresponding to each of said associated users;

authenticate the user based on the biometric information corresponding to the list of associated users and the scanned biometric information; and determine access rights for the authenticated user and provide access to the authenticated user to operate the building equipment based on the determined access rights, wherein the access rights for the authenticated user define access to a pairing manager, and one or more of an air quality manager, a schedule manager, and an energy saving manager, wherein the pairing manage is configured to provide a device pairing key, wherein the building equipment is a thermostat.

12. The system as claimed in claim 11, further comprising a server configured to store a master list of users, and affiliated building equipment, one or more biometric information and access rights corresponding to each of said users, said server configured to periodically update the list of associated users, and the one or more biometric information and access rights corresponding to each of the associated users stored within each of the affiliated building equipment.

13. The system as claimed in claim 11, wherein said processing circuit comprises:

a memory configured to store a pre-determined set of instructions;

a processor configured to cooperate with the memory, and further configured to generate a set of processing commands based on the pre-determined set of instructions;

a data comparator, under the set of processing commands, configured to receive the scanned biometric information, and is further configured to tag an associated user when the biometric information stored in the memory matches with the scanned biometric information;

a data extractor, under the set of processing commands, configured to extract the access rights corresponding to the tagged user; and a data analyzer configured to cooperate with the data extractor, and under the set of processing commands is configured to analyze the extracted access rights to determine a level of access to be permitted to said tagged user, wherein the data comparator, the data extractor, and the data analyzer are implemented using one or more processor(s).

14. The system as claimed in claim 11, wherein the access rights include access to a temperature setting, the air quality manager, the schedule manager, the energy saving manager, the thermostat, and a notification manager.

15. The system as claimed in claim 11, wherein said biometric identification unit is implemented using a portable electronic device.

16. A method for controlling access to a building equipment having a processing circuit, said method includes the steps performed by the processing circuit comprising:

storing, a list of associated users having access to said building equipment, and one or more biometric information and access rights corresponding to each of said associated users;

receiving, scanned biometric information scanned from a user from a biometric identification unit associated with said building equipment;

authenticating, the user based on the biometric information corresponding to the list of associated users and the received biometric information;

determining, access rights for the authenticated user; and providing access to the authenticated user to operate the building equipment associated with the biometric identification unit, based on the determined access rights, wherein the access rights for the authenticated user define access to a pairing manager, and one or more of an air quality manager, a schedule manager, and an energy saving manager, wherein the pairing manage is configured to provide a device pairing key, wherein the building equipment is a thermostat.

17. The method as claimed in claim 16, wherein the processing circuit comprises:
- a memory configured to store a pre-determined set of instructions;
- a processor configured to cooperate with the memory, and further configured to generate a set of processing commands based on the pre-determined set of instructions;
- a data comparator, under the set of processing commands, configured to receive the scanned biometric information, and is further configured to tag an associated user when the biometric information stored in the memory matches with the scanned biometric information;
- a data extractor, under the set of processing commands, configured to extract the access rights corresponding to the tagged user; and
- a data analyzer configured to cooperate with the data extractor, and under the set of processing commands is configured to analyze the extracted access rights to determine a level of access to be permitted to said tagged user,
- wherein the data comparator, the data extractor, and the data analyzer are implemented using one or more processor(s).

18. The method as claimed in claim 16, wherein the processing circuit is configured to perform a step of periodically establishing a communication link with a server to receive and store an updated list of associated users having access to the building equipment, and one or more biometric information and access rights corresponding to each of said associated users.

19. The method as claimed in claim 16, wherein the processing circuit is configured to provide a notification indicating at least one of successful authentication and unsuccessful authentication.

20. The method as claimed in claim 16, wherein the access rights include access to two or more of a temperature setting, the air quality manager, the energy saving manager, and a notification manager.

* * * * *